United States Patent
Bishop

(10) Patent No.: US 10,634,466 B2
(45) Date of Patent: Apr. 28, 2020

(54) SEALABLE SHORT-PATHLENGTH LIQUID TRANSMISSION CELL FOR FOURIER-TRANSFORM INFRARED SPECTROSCOPY APPLICATIONS

(71) Applicant: The United States of America, as represented by the Secretary of the Navy, Crane, IN (US)

(72) Inventor: Michael L. Bishop, Norco, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/265,214

(22) Filed: Feb. 1, 2019

(65) Prior Publication Data

US 2019/0234865 A1   Aug. 1, 2019

Related U.S. Application Data

(60) Provisional application No. 62/625,131, filed on Feb. 1, 2018.

(51) Int. Cl.
*G01N 21/01* (2006.01)
*F42B 3/113* (2006.01)
(Continued)

(52) U.S. Cl.
CPC .............. *F42B 3/113* (2013.01); *G01N 21/01* (2013.01); *G01N 21/3577* (2013.01); *G01N 2021/0106* (2013.01); *G01N 2021/3595* (2013.01)

(58) Field of Classification Search
CPC ........... G01N 21/03; G01N 2021/0346; G01N 21/05; G01N 21/0303; G01N 30/74; G01N 21/01; G01N 2021/035; G01N 21/0332; G01N 21/31; G01N 21/645; G01N 21/658; G01N 21/76; G01N 2015/1486; G01N 21/253; G01N 21/552; G01N 15/1459; G01N 2021/0328; G01N 2021/036; G01N 2021/6419; G01N 2021/6421; G01N 2021/6432; G01N 2021/6439; G01N 2021/651; G01N 2035/00346; G01N 21/272; G01N 21/278; G01N 21/59; G01N 21/6428; G01N 2201/062; G01N 2201/0627; G01N 35/0098; G01N 35/025;
(Continued)

(56) References Cited

U.S. PATENT DOCUMENTS 3,893,769 A * 7/1975 Woolley .................. F27B 17/02
356/312
5,404,217 A * 4/1995 Janik .................. G01N 15/1404
250/576

(Continued)

*Primary Examiner* — Michael P Stafira
(74) *Attorney, Agent, or Firm* — Naval Surface Warfare Center, Crane Division; Eric VanWiltenburg

(57) ABSTRACT

The invention relates to sealable short-pathlength liquid transmission cells for Fourier-transform infrared spectroscopy applications. In exemplary embodiments, a liquid transmission cell with transmissions sections uses horizontal tubing for inserting and removing fluids from the cell. Angling the tubing relative to a top face of the cell allows small amounts of entrapped air to rise out of the optical path without blocking spectroscopy measurements. The tubing is silver-soldered to the body of the transmission cell to make a leak-free connection.

4 Claims, 4 Drawing Sheets

(51) Int. Cl.
*G01N 21/3577* (2014.01)
*G01N 21/35* (2014.01)

(58) Field of Classification Search
CPC .. G01N 15/1434; G01N 15/1436; G01N 1/44; G01N 2015/1037; G01N 2021/0325; G01N 2021/0367; G01N 2021/3181; G01N 2021/6441; G01N 2021/6484; G01N 2021/6491; G01N 221/95646; G01N 2030/645; G01N 2035/00356; G01N 2035/00524; G01N 2035/0097; G01N 2035/042; G01N 2035/0425; G01N 2035/0441; G01N 2035/0443; G01N 2035/0444; G01N 2035/0455; G01N 2035/0491; G01N 2035/0494; G01N 2035/103; G01N 21/13; G01N 21/21; G01N 21/3151; G01N 21/33; G01N 21/3563; G01N 21/359; G01N 21/51; G01N 21/554; G01N 21/64; G01N 21/6452; G01N 21/6454; G01N 21/66; G01N 21/74; G01N 21/956; G01N 2201/0415; G01N 2201/068; G01N 27/305; G01N 30/26; G01N 30/64; G01N 30/78; G01N 33/4925; G01N 33/5438; G01N 35/00693; G01N 35/0092; G01N 35/0099; G01N 35/026; G01N 35/028; G01N 35/04; G01N 35/1002; G01N 15/1463; G01N 17/00; G01N 1/286; G01N 1/42; G01N 2001/315; G01N 2015/1006; G01N 2015/1452; G01N 2015/149; G01N 2015/1493; G01N 2021/0382; G01N 2021/0389; G01N 2021/0392; G01N 2021/052; G01N 2021/054; G01N 2021/1738; G01N 2021/1751; G01N 2021/3595; G01N 2021/399; G01N 2021/5973; G01N 2021/6463; G01N 2021/6467; G01N 2021/6482; G01N 2030/746; G01N 2030/8417; G01N 2033/0091; G01N 2035/00326; G01N 2035/00396; G01N 2035/00544; G01N 2035/0448; G01N 2035/1037; G01N 2035/1046; G01N 21/031; G01N 21/0317; G01N 21/09; G01N 21/15; G01N 21/251; G01N 21/255; G01N 21/27; G01N 21/3518; G01N 21/3554; G01N 21/61; G01N 21/6445; G01N 21/6486; G01N 21/67; G01N 21/69; G01N 21/75; G01N 21/7703; G01N 21/87; G01N 21/88; G01N 2201/02; G01N 2201/0221; G01N 2201/0446; G01N 2201/065; G01N 2201/1226; G01N 2201/127; G01N 2203/0016; G01N 25/16; G01N 27/44721; G01N 30/84; G01N 33/1806; G01N 33/20; G01N 33/4905; G01N 33/521; G01N 33/54386; G01N 33/558; G01N 35/08; G01N 35/1095; G01N 3/02; G01J 3/0218; G01J 3/024; G01J 3/02; G01J 3/10; G01J 3/42; G01J 1/0422; G01J 1/16; G01J 1/42; G01J 2001/4252; G01J 3/0202; G01J 3/0256; G01J 3/0264; G01J 3/0267; G01J 3/0272; G01J 3/0286; G01J 3/0291; G01J 3/4535; G02B 21/34; G02B 5/202; G02B 5/284; G02B 6/29358; G02B 21/0004; G02B 6/3652; G02B 6/4292; G02B 6/43; G02B 21/0008; G02B 21/0012; G02B 21/0088; G02B 21/26; G02B 21/33; G02B 21/365; G02B 21/368; G02B 6/4206; G02B 6/4261; G02B 6/4284; G01B 11/02; G01B 11/254; G01B 11/255

See application file for complete search history.

(56) References Cited

U.S. PATENT DOCUMENTS

| | | | | |
|---|---|---|---|---|
| 2002/0044748 | A1* | 4/2002 | Tatoh | G02B 1/02 385/93 |
| 2002/0149773 | A1* | 10/2002 | Martino | G01N 21/05 356/436 |
| 2006/0018609 | A1* | 1/2006 | Sonoda | G02B 6/4204 385/93 |
| 2014/0152977 | A1* | 6/2014 | Ranftl | G01N 21/0303 356/51 |

* cited by examiner

SEALABLE SHORT-PATHLENGTH LIQUID TRANSMISSION CELL FOR FOURIER-TRANSFORM INFRARED SPECTROSCOPY APPLICATIONS

CROSS-REFERENCE TO RELATED APPLICATIONS

This patent application claims the benefit of U.S. Provisional Application No. 62/625,131, titled "SEALABLE SHORT-PATHLENGTH LIQUID TRANSMISSION CELL FOR FOURIER-TRANSFORM INFRARED SPECTROSCOPY APPLICATIONS", filed Feb. 1, 2018, the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,498) is assigned to the United States Government and is available for licensing for commercial purposes. Licensing and technical inquiries may be directed to the Technology Transfer Office, Naval Surface Warfare Center Corona Division, email: CRNA_CTO@navy.mil.

FIELD OF THE INVENTION

The invention relates to sealable short-pathlength liquid transmission cells for Fourier-transform infrared spectroscopy applications.

BACKGROUND AND SUMMARY OF THE INVENTION

The present invention relates to a sealable short-pathlength liquid transmission cell to seal a liquid inside a short pathlength transmission cell for a prolonged period of time, preventing the liquid inside from leaking to the outside of the cell, and preventing air from outside the cell from leaking into the cell. The sealable short-pathlength liquid transmission cell design provides a means to seal standard reference solutions inside short-path liquid transmission cells.

Commercially-available short pathlength liquid transmission cell for FTIR applications do not permit a liquid to be sealed inside the cell for a prolonged time. In previous designs, liquid samples can leak directly through friction-fit tapered caps or plugs, or the liquid's vapor pressure can loosen such caps or plugs if the cell temperature increases.

According to an illustrative embodiment of the present disclosure, a liquid transmission cell with transmissions sections uses horizontal tubing for inserting and removing fluids from the cell. Angling the tubing relative to a top face of the cell allows small amounts of entrapped air to rise out of the optical path without blocking spectroscopy measurements. The tubing is silver-soldered to the body of the transmission cell to make a leak-free connection.

According to a further illustrative embodiments of the present disclosure, vertical or angled tubing can be used instead of horizontal tubing.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1A:
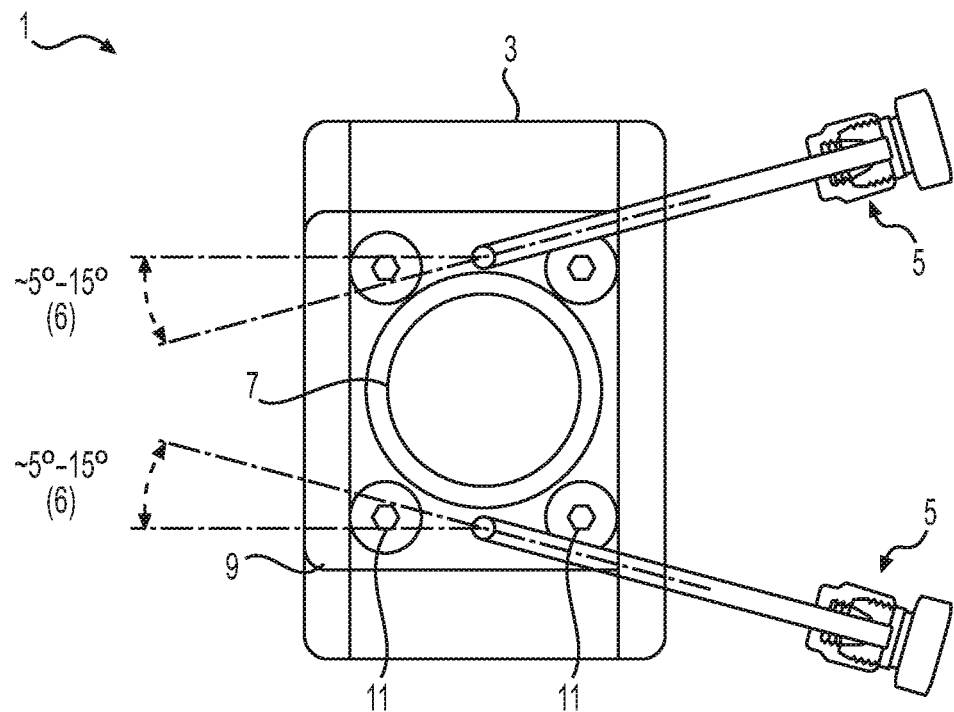
FIGS. 1A-1B show an exemplary liquid transmission cell with a horizontal tubing.
Figure 1B:
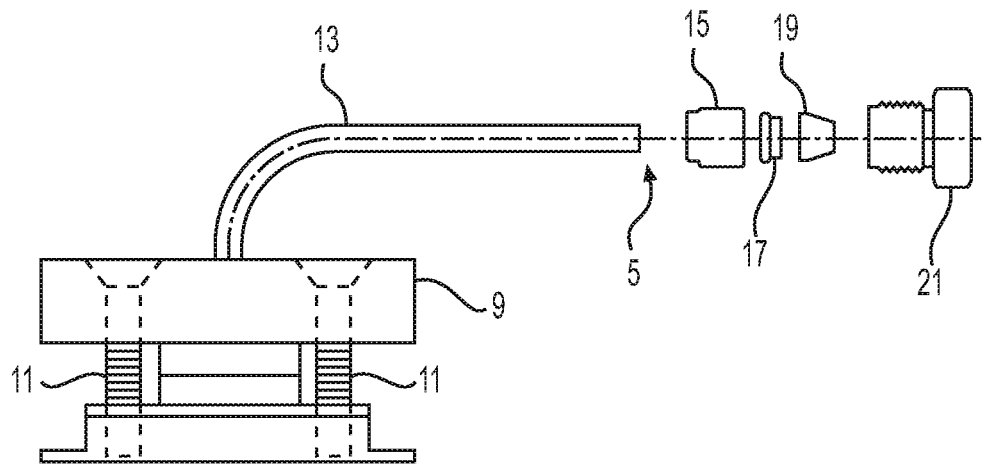

FIGS. 1A-1B show an exemplary liquid transmission cell 1 with a horizontal tubing 13. Cell container 3 is coupled to a cell body 9. Optical window 7 provides an optical path for a FTIR spectrometer or visual inspection. Connectors 11 couple body 9 to container 3 and keep optical window 7 locked in place. Transmission sections 5 provide fluid transmission paths between the interior and exterior of the cell 1. Transmission sections 5 use stainless-steel tubing 13 and threaded compression fittings that can provide a leak-free seal for gases and liquids. Cap 21 connects to tubing 13 through threaded fittings, with nut 15, back ferrule 17, front ferrule 19 helping to seal the connection between cap 21 and tubing 13. Stainless-steel tubing 13 is silver-soldered to the body 9 of the transmission cell 1 to make a leak-free connection. When a cell 1 is in its operational position, tubes 13 are angled from the horizontal center-line of a cell to permit the cell 1 to be filled with liquid and capped without entrapping air that would interfere with FTIR measurements. In operation, a liquid sample or reference solution is loaded through transmission sections 5 into the cell 1 by any compatible means. The angle of the tubing 13 of an exemplary cell such as shown in FIG. 1 will cause small amounts of entrapped air to rise out of the optical path of the cell into the upper tubing and fittings when a cell is placed in the sample compartment of a typical FTIR spectrometer.

Figure 2A:
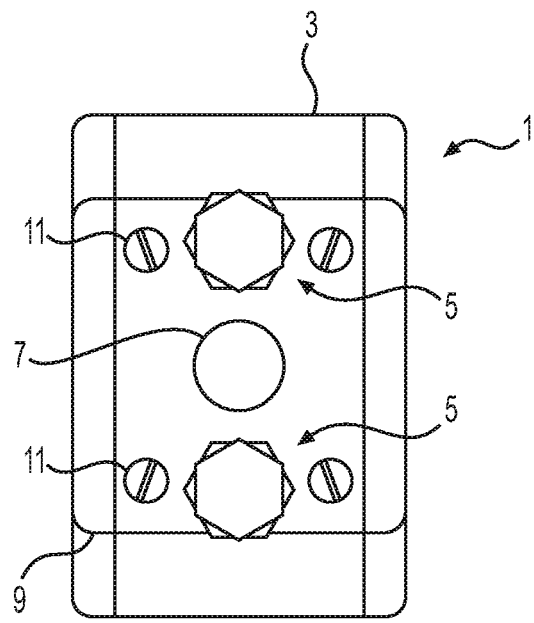
FIGS. 2A-2B show an exemplary liquid transmission cell with a vertical tubing.
Figure 2B:
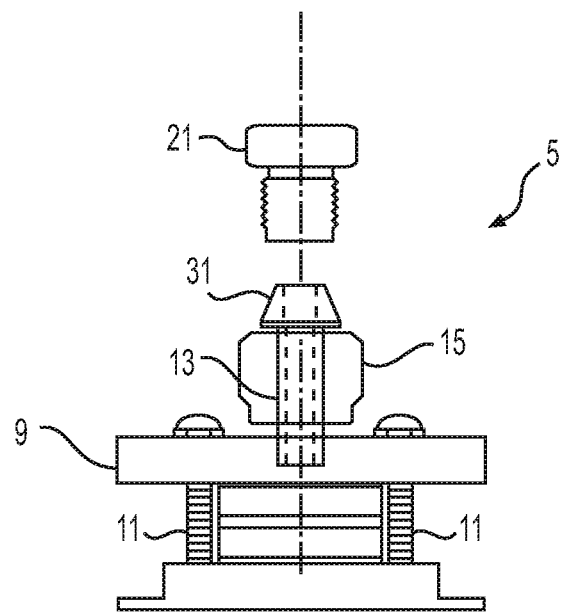

FIGS. 2A-2B show an exemplary liquid transmission cell 1 with short path length vertical tubing 13. Cell container 3 is coupled to a cell body 9. Optical window 7 provides an optical path for a FTIR spectrometer or visual inspection. Connectors 11 couple body 9 to container 3 and keep optical window 7 locked in place. Transmission sections 5 provide fluid transmission paths between the interior and exterior of the cell 1. Transmission sections 5 use stainless-steel tubing 13 and threaded compression fittings that can provide a leak-free seal for gases and liquids. Cap 21 connects to tubing 13 through threaded fittings, with nut 15 and ferrule 31 helping to seal the connection between cap 21 and tubing 13. Stainless-steel tubing 13 is silver-soldered to the body 9 of the transmission cell 1 to make a leak-free connection.

Figure 3A:
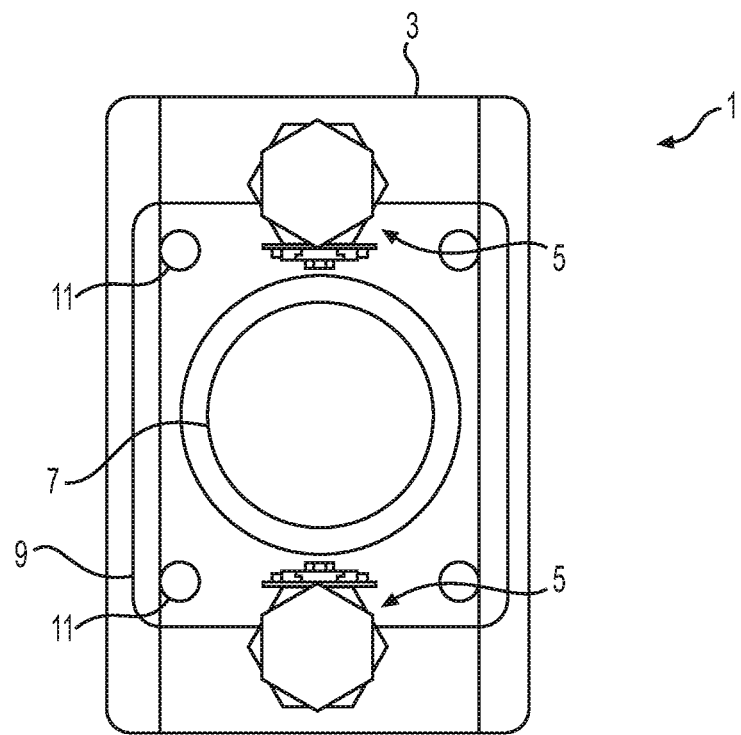
FIGS. 3A-3C show exemplary liquid transmission cells with an angled tubing.
Figure 3B:
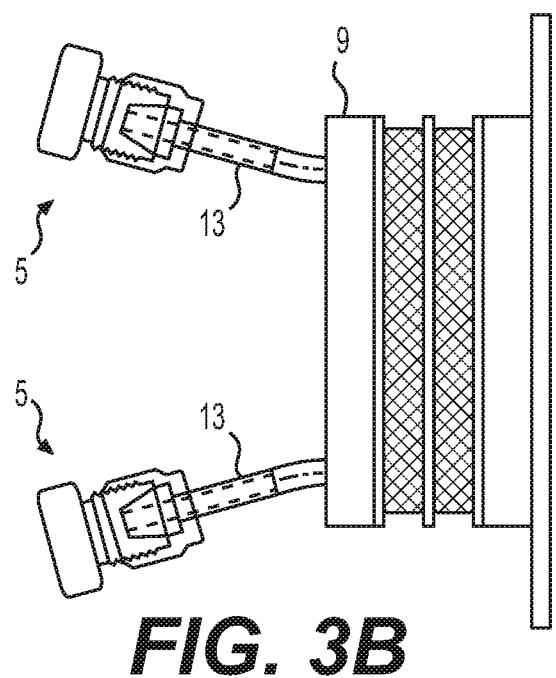
Figure 3C:
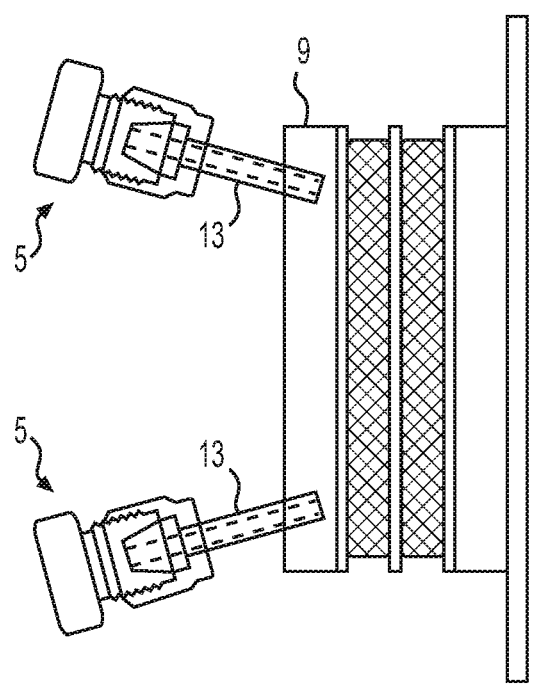

FIGS. 3A-3C show exemplary liquid transmission cells 1 with an angled tubing 13. Cell container 3 is coupled to a cell body 9. Optical window 7 provides an optical path for a FTIR spectrometer or visual inspection. Connectors 11 couple body 9 to container 3 and keep optical window 7 locked in place. Transmission sections 5 provide fluid transmission paths between the interior and exterior of the cell 1. Transmission sections 5 use stainless-steel tubing 13 and threaded compression fittings that can provide a leak-free seal for gases and liquids. The angled tubing 13 connections provide a means to remove entrapped air or gas from the optical path of the cell, but permitting tubing and fittings to project along the optical path of the cell rather than sideways. In FIG. 3B, tubing 13 has a curve. In FIG. 3C, tubing 13 is straight.

The tubing and fitting design can be adapted to liquid transmission cells that support liquid flow through the cell or it can be adapted to cells that do not support liquid flow through the cell. A liquid sample or reference solution may remain in the cell for prolonged times (6 to 12 months or longer) without leaking and may be used for FTIR measurements repeatedly during such a time period. Because tubing and fittings used in the design are made of similar materials to cell bodies of commercially-available short-pathlength liquid transmission cells, the sealable liquid transmission cell design can be used in any application that requires a leak-free, short-pathlength liquid transmission cell. The sealable liquid transmission cell design can be used with flow cells and can thus be used to provide a leak-free seal for flow applications. This can permit chemical processes to be monitored on-line/real time by connecting the cell's fittings to a process flow stream or sample stream.

Although the invention has been described in detail with reference to certain preferred embodiments, variations and modifications exist within the spirit and scope of the invention as described and defined in the following claims.

The invention claimed is:
1. A liquid transmission cell comprising:
a cell container;
a cell body;
an optical window;
a plurality of coupling devices, wherein the plurality of coupling devices couple the cell body and optical window to the cell container;
a first and second transmission path, each comprising:
 tubing;
 a cap coupled to a first end of the tubing;
 a ferrule and a nut between the tubing and cap, wherein the ferrule creates a seal between the cap and tubing;
wherein a second end of the tubing is coupled to a top surface of the cell body by silver soldering.

2. The cell of claim 1, wherein a first portion of the tubing comprising at least half of the tubing is approximately parallel to the top surface of the cell body, wherein the first portion of the tubing includes the first end.

3. The cell of claim 2, wherein a first and second line extending along the first portion of the first and second transmission path tubing creates an angle that is between 10° and 30°.

4. The cell of claim 1, wherein a first portion of the tubing comprising at least half of the tubing is approximately perpendicular to the top surface of the cell body, wherein the first portion of the tubing includes the first end.

* * * * *